(12) United States Patent
Kawahito

(10) Patent No.: US 7,409,678 B2
(45) Date of Patent: Aug. 5, 2008

(54) COMPILER, COMPILATION AND STORAGE

(75) Inventor: Motohiro Kawahito, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 11/045,923

(22) Filed: Jan. 28, 2005

(65) Prior Publication Data

US 2005/0166195 A1 Jul. 28, 2005

(30) Foreign Application Priority Data

Jan. 28, 2004 (JP) ............................. 2004-019506

(51) Int. Cl.
*G06F 9/45* (2006.01)
(52) U.S. Cl. ...................................... 717/140; 717/151
(58) Field of Classification Search ......... 717/140–141, 717/151–153, 169, 106
See application file for complete search history.

(56) References Cited

U.S. PATENT DOCUMENTS

| | | | | |
|---|---|---|---|---|
| 5,287,510 A * | 2/1994 | Hall et al. | ................... | 717/160 |
| 5,355,494 A * | 10/1994 | Sistare et al. | ............... | 717/154 |
| 6,085,035 A * | 7/2000 | Ungar | ........................ | 717/116 |
| 6,609,249 B2 * | 8/2003 | Kunz et al. | ................. | 717/161 |
| 6,738,967 B1 * | 5/2004 | Radigan | .................... | 717/146 |
| 7,028,292 B1 * | 4/2006 | Yokota et al. | ............... | 717/139 |
| 7,073,169 B2 * | 7/2006 | Ogawa et al. | ............... | 717/161 |
| 2004/0194071 A1 * | 9/2004 | Tanaka | ....................... | 717/136 |

OTHER PUBLICATIONS

Jin Lin, et al., "A Compiler Framework for Speculative Analysis and Optimizations", May 2003, ACM Press, SIGPLAN 2003, vol. 38 Issue 5, pp. 289-299.*
Michael Burke, et al., "Interprocedural Optimization: Eliminating Unnecessary Recompilation", Jul. 1993, ACM Press, ACM TOPLAS, vol. 15 Issue 3, pp. 367-399.*
Vera et al. "Data cache locking higher program predictability", Jun. 2003, ACM, SIGMETRICS '03, pp. 272-282.*
Sperber et al. Generation of LR parsers by partial evaluation, Mar. 2000, ACM, TOPLAS, vol. 22, Issue 2, pp. 224-264.*

* cited by examiner

*Primary Examiner*—Wei Y. Zhen
*Assistant Examiner*—Anna Deng
(74) *Attorney, Agent, or Firm*—Louis P. Herzberg

(57) ABSTRACT

Copiles a series of instructions by optimizing them for a process executed if a variable has a particular value. An optimization compiler including an update instruction detecting section that detects, in a program to be optimized, an update instruction to update a content of a variable or a content of a storage area specified by a variable, a series of instructions detecting section that detects a series of instructions in the target program, a compile section that compiles the detected series of instructions by optimizing the series of instructions for a process executed if the variable or the storage area has a predetermined particular content, and a generating section that generates a set instruction to set a destination address in the control shift instruction to an address of the series of instructions optimized by the series of instructions compile section.

20 Claims, 13 Drawing Sheets

Before optimization   20 this.V = ...  — (1)

(b)

After optimization   30

```
1: synchronized(this) {
2:    this.V = ...  — (1)
3:    if( this.V meets specialization conditions ) {
4:       this.method_table= method table containing addresses of specialized methods
5:       <Instruction to change operand of call instruction to address of specialized method>
6:    } else {
7:       this.method_table= Normal method table
8:       <Instruction to change operand of call instruction to address of normal method>
9:    }
10: }
```

Before optimization this.V1 = ... – (1)

(b)

After optimization

30

```
1: synchronized(this) {
2:     this.V1 = ... – (1)
3:     if this.V1 meets specialization conditions
4:     if( this.method_table is method table containing addresses of methods specialized for V2
5:         this.method_table=method table containing addresses of methods specialized for V1 or V2
6:         <Instruction to change operand of each call instruction to address of method specialized
           for V1 or V2>
7:     } else {
8:         this.method_table=method table containing addresses of methods specialized for V1
9:         <Instruction to change operand of each call instruction to address of method specialized
           for V1 or V2>
10:    }
11:    } else {
12:    if( this.method_table is method table containing addresses of methods specialized for V2
13:        this.method_table=method table containing addresses of methods specialized for V2
14:        <Instruction to change operand of each call instruction to address of method specialized
           for V2>
15:    } else {
16:        this.method_table= Normal method table
17:        <Instruction to change operand of call instruction to address of normal method>
18:    }
19:    }
20: }
```

Before optimization

20

1: private int fCalled;

2: public boolean scanSubset(...) { /* This is not constructor */
3:     if (fScannerState == SCANNER_STATE_TEXT_DECL) {
4:         if (fHandler != null) {
5:             fCalled ++; - (1)
       ...

6: private void init() { /* This is not constructor */
7:     fCalled = 0; - (2)
    ...

8: public void frequentlyCalledMethod(...) { /* Frequency executed method */
9:     if (fCalled == 0) {
10:        Process 1
11:    } else {
12:        Process 2
13:    }
       ;

Figure 7

After optimization

30

```
1:  private int fCalled;

2:  public boolean scanSubset(...) {   /* This is not constructor */
3:      if (fScannerState == SCANNER_STATE_TEXT_DECL) {
4:          if (fHandler != null) {
5:              fCalled ++;  - (1)
6:              this.method_table = Normal method table
        ....

7:  private void init() {   /* This is not constructor */
8:      fCalled = 0;  - (2)
9:      this.method_table = method table containing address of frequentlyCalledMethod_Special
        ....

10: public void frequentlyCalledMethod(...) {   /* Normal method */
11:     if (fCalled == 0) {
12:         Process 1
13:     } else {
14:         Process 2
15:     }
        ..

16: public void frequentlyCalledMethod_Special(...) {   /* Specialized method */ - (4)
17:     Process 1
        ..
```

Before optimization      20

```
1:  class B {
2:    private static int fCalled;
3:    public static boolean scanSubset(...) { /* This is not constructor */
4:      if (fScannerState == SCANNER_STATE_TEXT_DECL) {
5:        if (fHandler != null) {
6:          fCalled ++;  - (1)
             :
7:    private static void init() { /* This is not constructor */
8:      fCalled = 0;  - (2)
         :
      /*  Frequently executed method: address 0x12345678 is assumed   */
9:    public static void frequentlyCalledMethod(...) {
10:     if (fCalled == 0) { - (3)
11:       Process 1
12:     } else {
13:       Process 2
14:     }
         :
15: }

16: class C {
17:   public test(...) {
18:     B.frequentlyCalledMethod(...); // call 0x12345678 (Machine code) - (5)
         :
19:     B.frequentlyCalledMethod(...); // call 0x12345678 (Machine code) - (6)
```

(b)

| Call destination address rewrite list ||
|---|---|
| Method identification information | Address of call instruction |
| frequentlyCalledMethod | (5), (6) ··· |
| ⋮ | ⋮ |

Before optimization     20

```
1:  public final class EncodingSupport {
2:    private int fEncodingType;
3:    private init(int encodingType)
4:    {
5:      fEncodingType = encodingType;  - (1)
                                  : Rest omitted 6:    public void convertCharsToBytes(...
7:    {
8:      switch (fEncodingType) {
9:      case EncodingSupport.U16BE:
10:       while (srcOffset < srcEnd) {
11:         char ch = src[srcOffset++];
12:         dst[dstOffset++] = (byte)(ch >> 8);
13:         dst[dstOffset++] = (byte)ch;
14:       }
15:       break;
16:     case EncodingSupport.U16LE:
17:       Process 2
18:       break;
19:     case ...  Rest omitted
```

(b)

After optimization     30

```
1:  public final class EncodingSupport {
2:    private int fEncodingType;
3:    private init(int encodingType)
4:    {
5:      fEncodingType = encodingType;  - (1)
6:      if (fEncodingType == EncodingSupport.U16BE) {
7:        method_table = Method table containing specialized methods such as
                        specialized convertCharsToBytes
8:      else                                                                  (2)
9:        method_table = Normal method table
                                  : Rest omitted 10:   public void convertCharsToBytes_Special(...)  /* Specialized method */
11:   {
12:     while (srcOffset < srcEnd) {  /* Remove switch statement */
13:       char ch = src[srcOffset++];
14:       dst[dstOffset++] = (byte)(ch >> 8);
15:       dst[dstOffset++] = (byte)ch;
16:     }
```

```
1:  public final class MyHashtable {
2:    private static final int HASHTABLE_SIZE = 128;
3:    private int[][] table;
4:    public MyHashtable() /* Constructor */
5:    {
6:      table = new int[HASHTABLE_SIZE][]; - (1)
7:    }

8:    public int get(int key)
9:    {
10:     int hash;
11:     hash = (key % HASHTABLE_SIZE);  /* Boundary check in (2) is to be removed */
12:     int[] bucket = table[hash]; - (2)
            ⋮
            ⋮
```

COMPILER, COMPILATION AND STORAGE

FIELD OF THE INVENTION

The present invention relates to a compiler, a compile method, a compile program, and a recording medium. In particular, the present invention relates to a compiler that carries out optimization based on specialization of a predetermined variable in a program as a particular content, as well as a compile method, a compile program, and a recording medium.

BACKGROUND

In recent years, a program language such as an object oriented language has been commonly used in order to reduce burdens on programmers and to improve the robustness, maintainability, and the like of programs. Compilers translate a program described in a program language into a machine language; they generally carry out various types of optimization in order to increase the speed at which the program is executed.

The following documents are considered:

[Patent Document 1]
Published Unexamined Patent Application No. 2002-259135.

[Non-patent Document 1]
Nobuhisa FUJINAMI, "Run-time Optimization for Object Oriented Language", Theses from Twelfth Conference of Japanese Software Science, September 1995, pp. 245 to 248.

[Non-patent Document 2]
Motohiro KAWAHITO, Hideaki KOMATSU, and Toshio NAKATANI, "Technique to Optimize Speculative Memory Accesses to Java® Language", Journal of the Information Processing Society of Japan, Vol. 44, No. 3, pp. 883 to 896, 2003 (Java® is a registered trade mark)., As an optimization that increases the execution speed for a program, a technique has been proposed which specializes a part of the program for a process executed if a variable referenced by the program has a particular value. For example, a technique has been proposed which operates for each method in a program to determine whether or not a variable has a particular value every time the method is called so that the program branches to a specialized series of instructions and a non-specialized series of instructions (see Patent Document 1).

Another technique has been used; for a private variable used only in an object, if it is known that a value is substituted into the variable only when the object is generated, all the methods in the object which use the variable are compiled by specialization (see Non-patent Document 1). Non-patent Document 2 will be described later.

According to the technique in Patent Document 1, the compiler generates an instruction to determine whether or not the variable has a particular value, at the beginning of processing executed by the method. Thus, every time the method is called, this determining process is executed. However, once it has been determined whether or not the variable has the particular value, this determination need no longer be executed unless the value of the variable is subsequently updated. Thus, unwanted determining processes may be executed.

Moreover, with this technique, only if the processing time reduced by specialization exceeds the processing time required to determine whether or not the variable has the particular value, the compiler determines that the efficiency of the entire program will be improved and then compiles the program by specialization. Consequently, the processing time required for unwanted determining processes may prevent the program from being appropriately specialized.

According to Non-patent Document 1, even if the particular value is likely to be substituted into the variable, the compiler cannot execute optimization unless it is ensured that the value is substituted into the variable. Thus, the optimization may not be appropriately executed even if the specialization is to improve execution efficiency.

SUMMARY OF THE INVENTION

The present invention enables a large series of instructions to be compiled by optimizing them for a process executed if a variable has a particular value. It is thus an aspect of the present invention to provide a compiler, a compile method, a compile program, and a recording medium all of which can solve the above problems.

In an example embodiment, the present invention provides an optimization compiler comprising an update instruction detecting section that detects an update instruction in a target program to be optimized, the update instruction updating a content of a variable or a content of a storage area specified by a variable, a series of instructions detecting section that detects a series of instructions in the target program, the series of instructions executes a different process corresponding to the content of the variable or the content of the storage area in response to control shifting to the process by a control shift instruction to shift the control to a different series of instructions, a series of instructions compile section that compiles the detected series of instructions by optimizing the series of instructions for a process executed if the variable or the storage area has a predetermined particular content, and a set instruction generating section that generates a set instruction to set a destination address in the control shift instruction to an address of the series of instructions optimized by the series of instructions compile section, the set instruction being executed between the update instruction and control shift instruction in the target program if the variable or the storage area has the particular content. The invention also provides a compiler program that allows a computer to function as an optimization compiler, a recording medium in which the compiler program is recorded, and a compile method using the optimization compiler.

BRIEF DESCRIPTION OF THE DRAWINGS

These, and further, aspects, advantages, and features of the invention will be more apparent from the following detailed description of a preferred embodiment and the appended drawings, in which:

FIG. 4 is a diagram showing a first example in which the optimization compiler 10 compiles a target program 20 by optimizing it for a result program 30;

FIG. 5 is a diagram showing a second example in which the optimization compiler 10 compiles the target program 20 by optimizing it for the result program 30;

FIG. 6 is a diagram showing the target program 20 in a third example in which the optimization compiler 10 compiles the target program by optimizing it for the result program 30;

FIG. 7 is a diagram showing the result program 30 in the third example in which the optimization compiler 10 compiles the target program 20 by optimizing it for the result program 30;

FIG. 9 is a diagram showing the target program 20 in a fourth example in which the optimization compiler 10 compiles the target program 20 by optimizing it for the result program 30;

FIG. 11 is a diagram showing a fifth example in which the optimization compiler 10 compiles the target program 20 by optimizing it for the result program 30;

FIG. 12 is a diagram showing a sixth example in which the optimization compiler 10 compiles the target program 20 by optimizing it for the result program 30.

DESCRIPTION OF SYMBOLS

Figure 1:
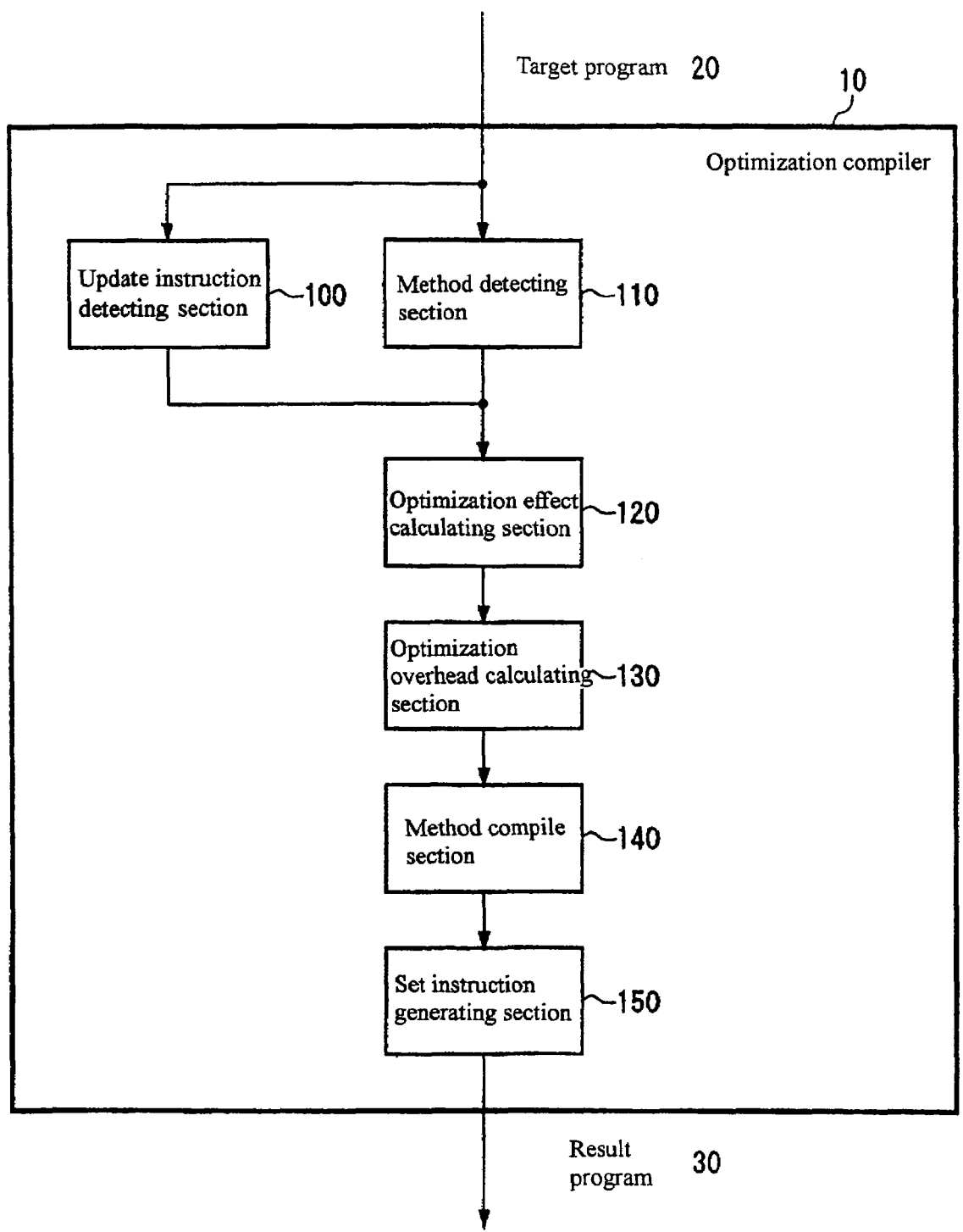
FIG. 1 is a functional block diagram of an optimization controller 10.

10 . . . Optimization compiler
20 . . . Target program
30 . . . Result program
100 . . . Update instruction detecting section
110 . . . Method detecting section
120 . . . Optimization effect calculating section
130 . . . Optimization overhead calculating section
140 . . . Method compile section
150 . . . Set instruction generating section
800 . . . Object
810 . . . Pointer
820 . . . First method table
830 . . . Series of instructions
840 . . . Second method table
850 . . . Series of instructions

DETAILED DESCRIPTION OF THE INVENTION

The present invention enables a large series of instructions to be compiled by optimizing them for a process executed if a variable has a particular value. It provides a compiler, a compile method, a compile program, and a recording medium all of which can solve the problems described above. This is accomplished by combining the characteristics set forth in the independent claims. The dependent claims specify further advantageous specific examples of the present invention.

In an example embodiment, the present invention provides an optimization compiler comprising an update instruction detecting section that detects an update instruction in a target program to be optimized, the update instruction updating a content of a variable or a content of a storage area specified by a variable, a series of instructions detecting section that detects a series of instructions in the target program, the series of instructions executes a different process corresponding to the content of the variable or the content of the storage area in response to control shifting to the process by a control shift instruction to shift the control to a different series of instructions, a series of instructions compile section that compiles the detected series of instructions by optimizing the series of instructions for a process executed if the variable or the storage area has a predetermined particular content, and a set instruction generating section that generates a set instruction to set a destination address in the control shift instruction to an address of the series of instructions optimized by the series of instructions compile section, the set instruction being executed between the update instruction and control shift instruction in the target program if the variable or the storage area has the particular content. The first aspect also provides a compiler program that allows a computer to function as an optimization compiler, a recording medium in which the compiler program is recorded, and a compile method using the optimization compiler.

The present invention will be described with reference to an example embodiment. However, the embodiment below does not limit the invention. Further, not all the combinations of the features described in the embodiment are essential to the solution of the present invention. Subcombinations of the group of these features may also constitute the present invention. The invention is not limited to all the described features of the present invention.

FIG. 1 is a functional block diagram of an optimization compiler 10. A target program 20 to be optimized which is described in an object oriented language or the like is inputted to the optimization compiler 10. The optimization compiler 10 optimizes each called method in the target program 20 for a process executed if a member variable used in an object in the target program 20 has a predetermined content. It is an object of the compiler to thus increase the speed at which the target program 20 is executed.

The optimization compiler 10 comprises an update instruction detecting section 100, a method detecting section 110 that is an example of a series of instructions detecting section according to the present invention, an optimization effect calculating section 120, an optimization overhead calculating section 130, a method compile section 140 that is an example of a series of instructions compile section according to the present invention, and a set instruction generating section 150. For each variable in the target program 20, the update instruction detecting section 100 detects an update instruction to update the content of the variable or the content of a storage area specified by the variable.

For example, if the variable exhibits a numerical value, the update instruction detecting section 100 may detect a substitution instruction to substitute a numerical value into the variable or an increment instruction to increase the numerical value of the variable. Further, if the variable is an array variable, the update instruction detecting section 100 may detect, as an update instruction, an instruction to store a numerical value indicative of the magnitude of the array variable in the storage area specified by the variable in order to initialize the array variable.

The method detecting section 110 detects a series of instructions in the target program 20 which executes a different process corresponding to the content of the variable or the content of the storage area in response to control shifting to the series of instructions by a control shift instruction to shift the control to a different series of instructions. Here, the series of instructions is, for example, a method in an object oriented language. Alternatively, the series of instructions may be a function or procedure in a function type program language or a predetermined subroutine.

The control shift instruction is a call instruction to call a method and allow it to be executed. This instruction is called a method invoke instruction or a method call instruction. However, in the following description of the present embodiment, this instruction will be called a call instruction. Alternatively, if the target program 20 is described in a function type program language, the control shift instruction may be a function call instruction. Alternatively, the control shift instruction may be a branch instruction to avoid executing a process for returning the control to the original series of instructions if the process is shifted to another series of instructions.

If a method detected by the method detecting section 110 is optimized for a process executed if the variable or the storage area has a particular content, the optimization effect calculating section 120 calculates an estimated reduction in execution time compared to the case in which the method is compiled without being optimized for the process. Then, the optimization effect calculating section 120 calculates the effect of the optimization by multiplying the calculated execution time for the method by the execution frequency of the method.

If a set instruction is generated which is executed if the variable or the storage area has the particular content, to set a call destination address in the method call instruction to the address of a series of instructions optimized by the method compile section 140, the optimization overhead calculating section 130 calculates an estimated processing time required for the set instruction. Then, the optimization overhead calculating section 130 multiplies the calculated estimated processing time by an estimated execution frequency of the set instruction to calculate an overhead in the optimization.

Subsequently, if the sum of the effects of the optimization for the respective methods exceeds the sum of overheads in the optimization for the respective set instructions, the method compile section 140 compiles each method detected by the method detecting section 110 by optimizing the method for the process executed if the variable or the storage area has the particular content. This optimization is called specialization. For example, the method compile section 140 may execute optimization by deleting conditional branch instructions based on the variable and compiling only a branch target series of instructions executed if the variable has a particular value.

In the description below, the method optimized by the method compile section 140 for the process executed if the variable or the storage area has the particular content will be called a specialized method for the variable or the storage area.

Similarly, if the sum of the effects of the optimization exceeds the sum of the overheads in the optimization, the set instruction generating section 150 generates, for each update instruction, a set instruction between the update instruction and any call instruction. Preferably, the set instruction generating section 150 generates a set instruction within a method in which each update instruction is executed. For example, the set instruction generating section 150 generates a set instruction in a part of the program that is executed immediately after each update instruction. Then, the set instruction generating section 150 outputs the target program 20 optimized as described above, as a result program 30 for the results of the compilation.

Figure 2:
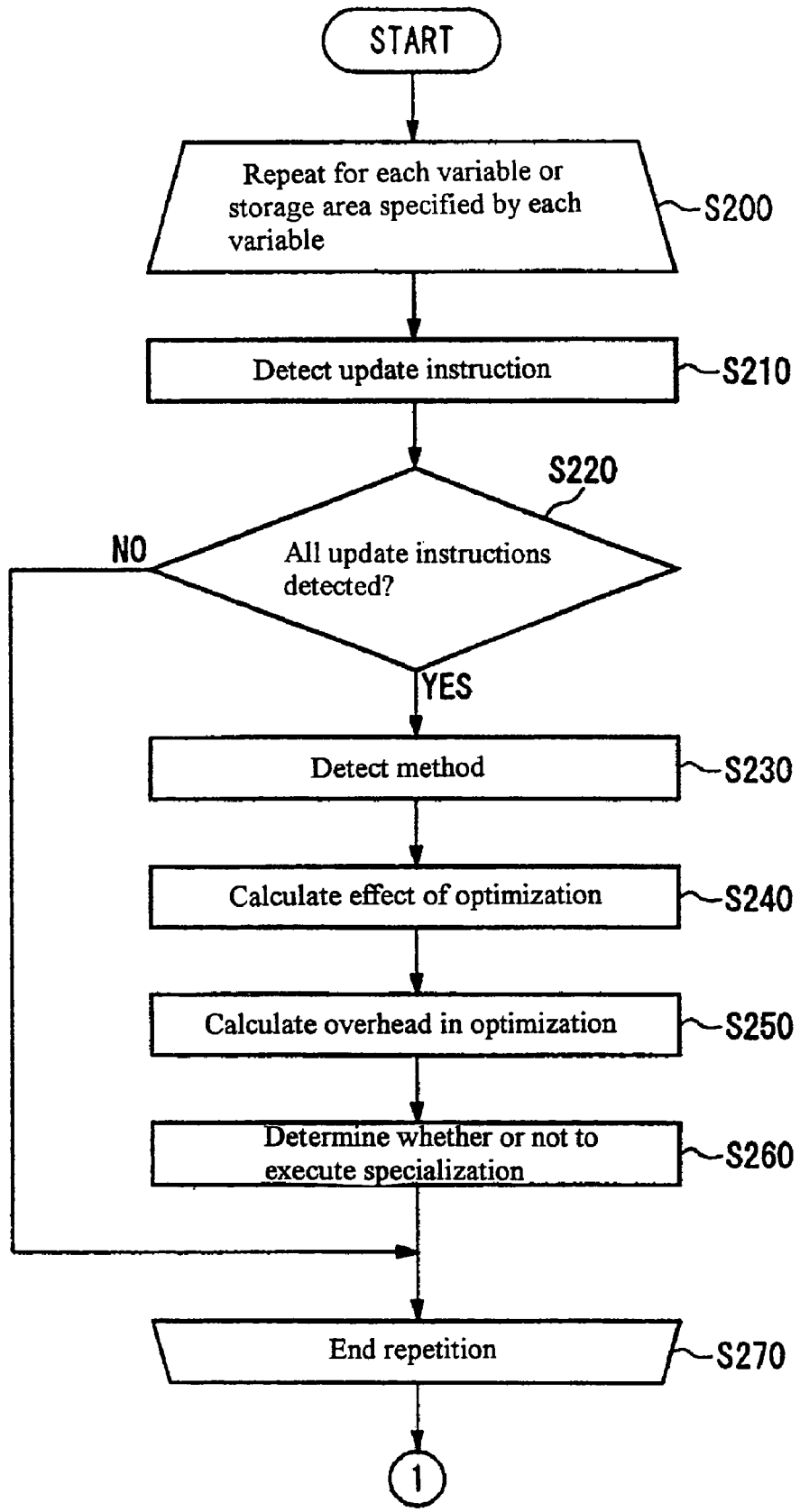
FIG. 2 is a chart showing an example of the operational flow of a process in which the optimization compiler 10 optimizes a method.

FIG. 2 shows an example of the operational flow of a process in which the optimization compiler 10 optimizes a method. The optimization compiler 10 repeats the process below for each variable in the target program 20 or each storage area specified by the variable (S200). First, the update instruction detecting section 100 detects all update instructions to update the content of the variable or the content of the storage area (S210). If only some of the update instructions have been successfully detected, that is, it cannot be ensured that all the update instructions have been successfully detected (S220: NO), the optimization compiler 10 shifts the process to a step S270 to repeat the determination for the next variable or storage area. On the other hand, if all the update instructions have been successfully detected (S220: YES), the method detecting section 110 detects all methods that execute different processes corresponding to the contents of the respective variables or storage areas (S230).

Subsequently, if the detected method has been optimized for the process executed if the variable or the storage area has the particular content, the optimization effect calculating section 120 calculates an estimated reduction in execution time compared to the case in which the method is compiled without being optimized for the process (S240). For example, the optimization effect calculating section 120 may calculate the estimated reduction in execution time as the number of cycles executed for machine language codes generated if the method is optimized for the process minus the number of cycles executed for machine language codes generated if the method is not optimized for the process.

More specifically, provided that no instructions that can change the content of the variable or storage area are contained in a range in the method detected by the method detecting section 110 which is executed before an instruction to read the content of the variable or storage area of the optimization effect calculating section 120, the optimization effect calculating section 120 calculates an estimated reduction in execution time accomplished by deleting instructions to read the content of the variable or storage area from the memory. Here, the instruction that can change the content of the variable or the content of the storage area specified by the variable may be, for example, a store instruction to store data at any address in the memory, a method call instruction, or an instruction to synchronize with another thread.

If the optimization effect calculating section 120 determines through alias analysis or the like that a store instruction executed before the instruction to read the content of the variable or storage area does not change the content of the variable or storage area, it excludes this store instruction from the instructions that can change the content of the variable or storage area. This analysis is realized by, for example, the technique described in Non-patent Document 2. Likewise, if the optimization effect calculating section 120 determines that a target method of a call instruction executed before the instruction to read the content of the variable or storage area does not change the content of the variable or storage area, it excludes this call instruction from the instructions that can change the content of the variable or storage area.

Depending on the program language describing the target program 20, the programmer may specify a volatile attribute for each variable in the target program 20 which attribute indicates that the content of the variable may be updated by processing executed by another thread. In this case, provided that the volatile attribute is not specified for a variable updated by the detected update instruction or a variable specifying a storage area updated by the update instruction, the optimization effect calculating section 120 calculates an estimated reduction in execution time accomplished by deleting instructions to read the content of the variable or storage area from the memory. However, in general, the programmer rarely specifies the volatile attribute for variables.

Then, the optimization effect calculating section 120 multiplies the estimated execution time calculated for each method by the estimated execution frequency of the method to calculate the effect of the optimization. For example, as the execution frequency of each method, the optimization effect calculating section 120 may acquire the number of times the method is called every time the target program 20 is executed once. More specifically, if the optimization compiler 10 is a runtime compiler that compiles the target program 20 in response to an instruction from an interpreter executing the target program 20, the optimization effect calculating section 120 may acquire the number of times that the interpreter has executed each method.

Subsequently, if the method compile section 140 generates a set instruction, the optimization overhead calculating section 130 calculates an estimated processing time required for the set instruction (S250). Then, the optimization overhead calculating section 130 multiplies the calculated estimated processing time by the estimated execution frequency of the set instruction to calculate an overhead in the optimization. Like the optimization effect calculating section 120, the optimization overhead calculating section 130 may acquire, as the estimated execution frequency of the set instruction, the number of times that a part of the target program 20 which is to generate the set instruction is to be executed. More specifically, if the optimization compiler 10 is a runtime compiler that compiles the target program 20 in response to an instruction from an interpreter executing the target program 20, the optimization overhead calculating section 130 may acquire the number of times that the interpreter has executed each method.

Subsequently, if sum of the effects of the optimization for the respective methods exceeds the sum of overheads in the optimization for the respective set instructions, the method compile section 140 determines that each method detected by the method detecting section 110 is to be compiled by being optimized for a process executed if the variable or the storage area has a particular content (S260).

If the optimization overhead calculating section 130 cannot acquire the execution frequency of each instruction in the target program 20, then instead of executing the above process, it may consider the processing time required for a set instruction generated in a constructor to have a very small value, for example, zero. As a result, the method compile section 140 can consider the execution frequency of the set instruction generated in the constructor for the object to have a very small value. Therefore, the method compile section 140 can execute specialization to compile the method detected by the method detecting section 110.

The optimization compiler 10 repeats the above process for each variable or each storage area specified by the variable (S270). The optimization compiler 10 can thus determine which method is to be optimized and which variable or storage area has the particular value when the method is optimized for a certain process.

Figure 3:
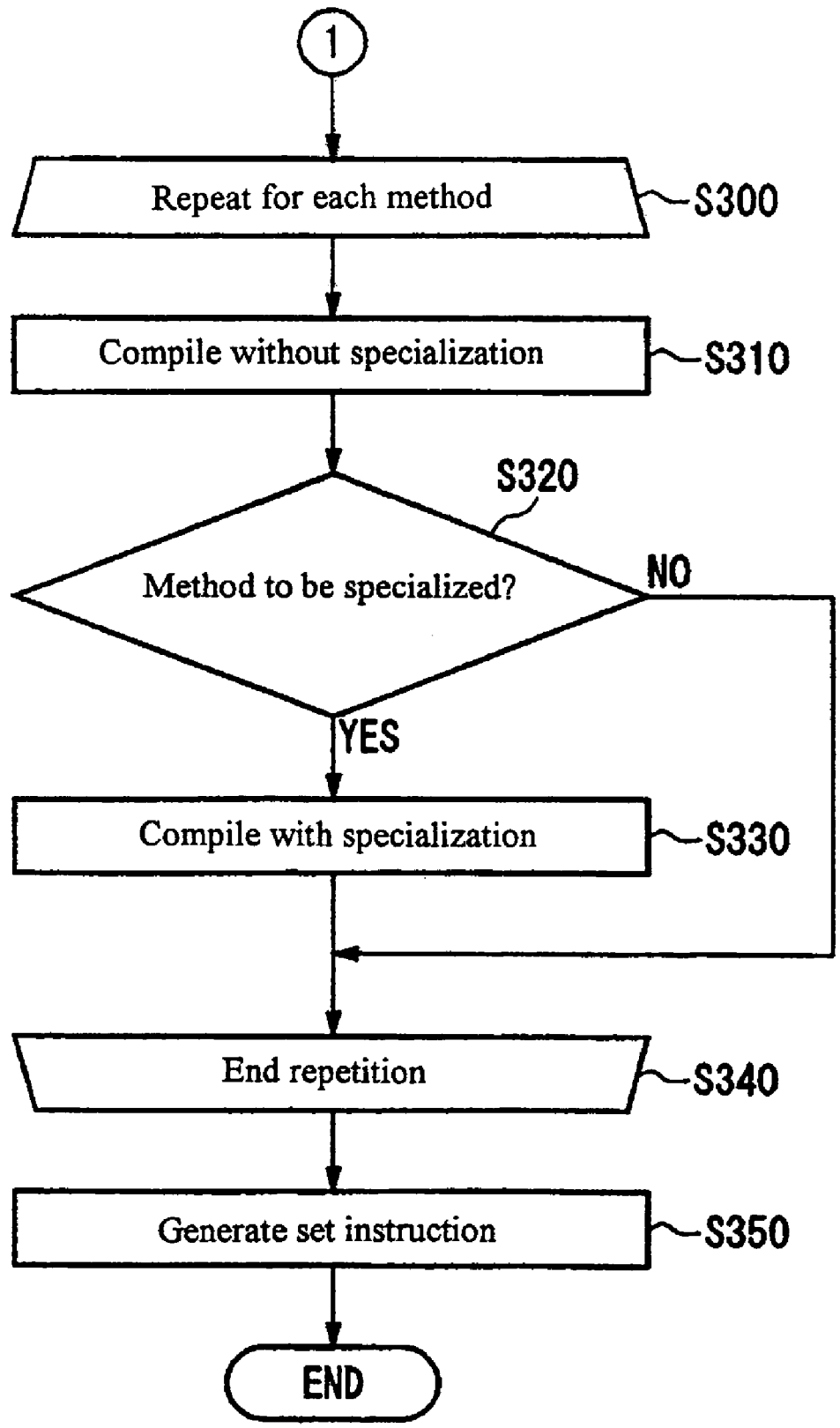
FIG. 3 is a chart showing a continued part of the operational flow of the process in FIG. 2.

FIG. 3 shows the operational flow of a process following FIG. 2. On the basis of the result of the determination in the process shown in FIG. 2, the optimization compiler 10 repeats the process described below for each method (S300). First, the method compile section 140 compiles the method without specialization (S310). Then, the method compile section 140 determines whether or not the method is to be compiled by specialization (S320). If the method is to be compiled by specialization (S320: YES), the method compile section 140 compiles the method by specializing it for a process executed if the variable or storage area used for the determination in the step S260 has a particular value (S330).

A plurality of variables or storage areas may be used for the specialization executed by the method compile section 140. For example, the method compile section 140 compiles a method by specializing it for a process executed if one variable has a first specific value and another variable has a second particular value. The optimization compiler 10 repeats the above process for each method (S340). Subsequently, for each update instruction for the variable determined to be used for the specialization, the set instruction generating section 150 generates a set instruction between the update instruction and the call instruction for the method specified for the content of the variable or storage area updated by the update instruction (S350).

With reference to the drawing, description has been given of an example of the process in which the optimization compiler 10 optimizes a method. However, the order of processing executed by the optimization compiler 10 is not limited to this example. For example, if the optimization compiler 10 is dynamic and compiles every called method, the compile process shown in the steps S310 and S330 may be executed when a method is called.

FIG. 4 shows a first example in which the optimization compiler 10 compiles the target program 20 by optimizing it for the result program 30. With reference to the present figure, a detailed description will be given of a process in which the set instruction generating section 150 generates a set instruction. FIG. 4(a) shows the target program 20 that has not been optimized yet. As an update instruction, the update instruction detecting section 100 detects a substitution instruction (1) that substitutes a certain value for a member variable V of an object this. The member variable V of the object this is expressed as this.V.

FIG. 4(b) shows the optimized target program, that is, the result program 30. The result program 30 has actually been obtained by compiling the target program 20 into a series of instructions in a machine language that can be executed by a computer. In the present figure, for description, the result program 30 is expressed as a source program indicating the meaning of a series of instructions in a machine language. This also applies to the optimized target program in the following description of the figures.

If the set instruction generating section 150 determines that the compiler optimize a method that executes a different process corresponding to the content of the variable this.V, it generates a set instruction (2) between the substitution instruction (1) and a call instruction, for example, in a part of the program executed immediately after the substitution instruction. More specifically, first, the set instruction generating section 150 generates an instruction in the fourth line which is executed if this.V meets conditions for specialization to set a method table for this method_table to one containing the address of a specialized method.

Here, the method table for the object this is a data structure in which identification information on each of a plurality of methods in the object this is associated with the address of a series of instructions that has compiled the method. That is, a call instruction calls a method by selecting, from the method table, an address associated with identification information on the method to be called and then shifting control to the address. The set instruction rewrites the method table to set a call destination address in the call instruction.

Then, as a set instruction, the set instruction generating section 150 generates an instruction in the fifth line which changes an operand in the call instruction to the address of the method specialized for this.V. Alternatively, the call instruction may contain an instruction code that instructs a shift in control and an operand indicating an address to which the control is shifted. This call instruction specifies the call destination address directly as an operand without using the method table. The set instruction can properly set a call destination address in such a call instruction by changing the operand of the call instruction to the address of the method specialized for this.V.

Moreover, as a set instruction, the set instruction generating section 150 generates an instruction in the seventh line which is executed if this.V does not meet the specialization conditions, to change the method table for the object this to one containing only addresses to a series of instructions compiled without specializing each method for this.V (normal method table). Then, the set instruction generating section 150 similarly generates an instruction in the eighth line which is executed if this.V does not meet the specialization conditions, to change the operand of the call instruction to an address in a normal method table, that is, the address of a series of instructions compiled without being specialized for this.V.

Further, if a plurality of threads concurrently execute the substitution instruction (1), the set instruction generating 150 generates a synchronized instruction indicating that one of the threads exclusively executes the first to tenth lines. This prevents the content of this.V from being changed by another thread after it has been determined in the third line that this.V meets the specialization conditions and before the method table is changed in the fourth line.

Preferably, if the set instruction generating section 150 determines that a single thread always executes an update instruction to update the content of this.V, it does not generate the synchronized instruction. In this case, the processing time required for the synchronized instruction is reduced to enable the target program 20 to be executed at a high speed.

FIG. 5 shows a second example in which the optimization compiler 10 compiles the target program 20 by optimizing it for the result program 30. FIG. 5(a) shows the target program 20 that has not been optimized yet. The update instruction detecting section 100 detects, as an update instruction, a substitution instruction (1) to substitute a certain value for a member variable V1 of the object this. The member variable V1 of the object this is expressed as this.V1. This object this further includes V2 that is a member variable. The member variable V2 of the object this is similarly expressed as this.V2.

A precondition for the description of the present figure is that the method compile section 140 compiles a group of methods in the target program 20 by specializing it for this.V1 and this.V2. Moreover, to allow for the situation in which this.V1 or this.V2 does not meet the specialization conditions, the method compile section 140 compiles the group of methods by specializing it only for this.V1 and then specializing it only for this.V2. Moreover, the method compile section 140 compiles the group of methods without specializing it for this.V1 or this.V2.

FIG. 5(b) shows the optimized target program, that is, the result program 30. If the set instruction generating section 150 determines that that the compiler optimize a method that executes a different process corresponding to the content of the variable this.V1 or this.V2, it generates a set instruction (2) between the substitution instruction (1) and a call instruction, for example, in a part of the program executed immediately after the substitution instruction. More specifically, first, as the set instruction (2), the set instruction generating section 150 generates, in the third line, an instruction to determine whether or not this.V1 meets the specialization conditions.

Then, the set instruction generating section 150 generates, in the fourth line, an instruction to determine whether or not the method table for the object this contains the address of the method specialized for this.V2. This instruction enables it to be determined whether or not another set instruction has already set the address of the method specialized for this.V2, in the method table for this, when an update instruction to update the content of this.V1 is executed.

Then, the set instruction generating section 150 generates an instruction as described below which is executed if the results of the determinations made by both instructions in the third and fourth lines are true, that is, both this.V1 and this.V2 meet the specialization conditions. First, the set instruction generating section 150 generates, in the fifth line, an instruction to change the method table for the object this to one containing the address of the method specialized for both this.V1 and this.V2. Then, the set instruction generating section 150 generates, in the sixth line, an instruction to change the operand in each call instruction to the address of the method specialized for both this.V1 and this.V2.

On the other hand, the set instruction generating section 150 generates an instruction as described below which is executed if the result of the determination made by the instruction in the third line is true, whereas the result of the determination made by the instruction in the fourth line is false, that is, this.V1 meets the specialization conditions and this.V2 does not. First, the set instruction generating section 150 generates, in the eighth line, an instruction to change the method table for the object this to one containing the address of the method specialized for this.V1. Then, the set instruction generating section 150 generates, in the ninth line, an instruction to change the operand in each call instruction to the address of the method specialized for this.V1.

Subsequently, the set instruction generating section 150 generates an instruction in the twelfth line which is executed if the object this.V1 does not meet the specialization conditions, to determine whether or not the method table for the object this contains the address of the method specialized for this.V2.

Then, the set instruction generating section 150 generates an instruction as described below which is executed if the result of the determination made by the instruction in the third line is false, whereas the result of the determination made by the instruction in the twelfth line is true, that is, this.V1 does not meet the specialization conditions but this.V2 does. First, the set instruction generating section 150 generates, in the thirteenth line, an instruction to change the method table for the object this to one containing the address of the method specialized for this.V2. Then, the set instruction generating section 150 generates, in the fourteenth line, an instruction to change the operand in each call instruction to the address of the method specialized for this.V2.

Further, the set instruction generating section 150 generates an instruction as described below which is executed if the results of the determinations made by both instructions in the third and twelfth lines are false, that is, neither this.V1 nor this.V2 meets the specialization conditions. First, the set instruction generating section 150 generates, in the sixteenth line, an instruction to change the method table for the object this to one containing the address of the method not specialized for this.V1 or this.V2. Then, the set instruction generating section 150 generates, in the seventeenth line, an instruction to change the operand in each call instruction to the address of the method not specialized for this.V1 or this.V2.

As shown in the example in the present figure, if the method is specialized for a plurality of variables, the set instruction generating section 150 generates an instruction executed every time an update instruction is executed, to determine which variable meets the specialization conditions at the point of the execution. This enables the maximally specialized method to be executed in accordance with a set of variables that meet the specialization conditions.

FIG. 6 shows the target program 20 in a third example in which the optimization compiler 10 compiles the target program 20 by optimizing it for the result program 30. The target program 20 contains methods scanSubset, init, and frequentlyCalledMethod that are not constructors for the object. The method frequentlyCalledMethod is known to be executed more frequently than the methods scanSubset and init. Further, the target program 20 defines a member variable fCalled of the object.

The target program 20 in the present figure contains update instructions in the methods scanSubset and init, which are not constructors. Accordingly, the target program 20 is not optimized by the technique in Non-patent Document 1. If the target program 20 is optimized by the technique in Non-patent Document 1, a series of instructions is generated in the method frequentlyCalledMethod, the series of instructions executing a process 1 or 2 depending on whether or not the content of the variable fCalled is 0. In this case, the speed is not improved compared to the process prior to the optimization. Actually, the impact analysis described in Patent Document 1 determines that this optimization is ineffective. Consequently, this optimization is not executed. Thus, the target program 20 in the present figure has not been successfully optimized by the prior art. In contrast, the optimization compiler 10 according to the present embodiment can optimize the target program 20. This will be described below.

First, an attribute is specified in the member variable fCalled of the object in the example shown in the present figure, the attribute indicating a read and write allowable range in the target program 20 within which an instruction to read or write the content of the variable is allowed to be executed. For example, a private attribute is specified for the variable fCalled in the first line of the program; the private attribute indicates that an instruction to read or write the content of the variable fCalled is allowed to executed only within the object to which the variable belongs.

Besides "private", the attribute indicating the read and write allowable range may be "protected", in which an instruction to read or write the content of the variable is allowed to be executed only in another object generated as a succession to the object to which the variable belongs, or "public", in which an instruction to read or write the content of the variable is allowed to be executed in all objects. Alternatively, the attribute indicating the read and write allowable range may be "final", which indicates that once a value is substituted for the variable, the variable is no longer changed.

The update instruction detecting section 100 detects all update instructions for the variable fCalled within its read and write allowable range, for example, within the methods in the object to which this variable belongs. For example, the update instruction detecting section 100 detects an increment instruction (1) to increment the variable, in the fifth line, and a substitution instruction to substitute zero into the variable, in the seventh line.

Subsequently, the method detecting section 110 detects a method that executes a different process corresponding to the variable fCalled, within the read and write allowable range for the variable, for example, within the methods in the object to which this variable belongs. For example, the method detecting section 110 detects the method frequentlyCalledMethod in the eighth to thirteenth lines, which method executes a different process depending on whether or not the variable fCalled is zero.

FIG. 7 shows the result program 30 in a third example in which the optimization compiler 10 complies the target program 20 by optimizing it for the result program 30. The method compile section 140 generates frequentlyCalledMethod_Special in the sixteenth and seventeenth lines by compiling the method frequentlyCalledMethod by specializing it for a process executed if the content of the variable fCalled is zero. This method is called a specialization series of instructions. The method compile section 140 generates a series of instructions in the tenth to fifteenth rows by compiling the method frequentlyCalledMethod without optimizing it for a process executed if the content of the variable fCalled is zero. This series of instructions is called a normal series of instructions.

Then, the set instruction generating section 150 generates, in the sixth line, executed immediately after the increment instruction (1) in the fifth line, a set instruction to set the method table method_table for the object this to be a normal method table containing the address of the frequentlyCalledMethod. As a result, if the value of the variable fCalled is incremented and the resulting numerical value is unknown, the unspecialized method frequentlyCalledMethod can be executed.

Further, the set instruction generating section 150 generates, in the ninth line, executed immediately after the substitution instruction (2) in the eighth line, a set instruction to set a method table containing the address of the method frequentlyCalledMethod_Special. As a result, if zero is substituted into the variable fCalled, the specialized method frequentlyCalledMethod_Special can be executed to make the process more efficient.

Thus, for each update instruction detected by the update instruction detecting section 100, if the content of the updated by the update instruction between the update instruction and a method call instruction is a particular one, the set instruction generating section 150 sets the call destination address in the call instruction to the address in the specialized series of instructions. If the content of the updated by the update instruction is not the particular one, the set instruction generating section 150 generates, as a set instruction, an instruction to set the call destination address in the call instruction to the address in the normal series of instructions. Thus, the set instruction can be executed only if the content of the variable can be updated. This makes it possible to reduce overhead accompanying the specialization of the method.

In the present figure, the set instruction generating section 150 need not generate, as a set instruction, a determination instruction to determine whether or not the variable or the like has a particular content. Specifically, if the content of the variable or storage area is set before the target program 20 is compiled, for example, zero is substituted into the variable fCalled, the set instruction generating section may generate an instruction to change the method table in accordance with the content of the variable. This eliminates unwanted determination instructions to further improve the execution efficiency of the result program 30.

Further, in the example shown in the present figure, the private attribute is specified in the variable fCalled. Accordingly, instructions to read or write the variable fCalled are executed only in objects for which the variable fCalled is defined. Therefore, the set instruction generating section 150 may generate a set instruction immediately after each of only the update instructions in the objects has been executed. This makes it possible to reduce the processing time required to detect an update instruction.

However, the programmer can unexceptionally change the content of a variable for which the private attribute is specified, using a method in another object. Thus, if the target program 20 is described in, for example, Java® (registered trade mark), the set instruction generating section 150 further generates a set instruction to set the call destination address in the call instruction to the address in a normal series of instructions, in a reflection method (for example, java®.lang.reflect.Field.set( ) method) of changing the content of the variable or storage area from outside the read and write range of the variable.

Figure 8:
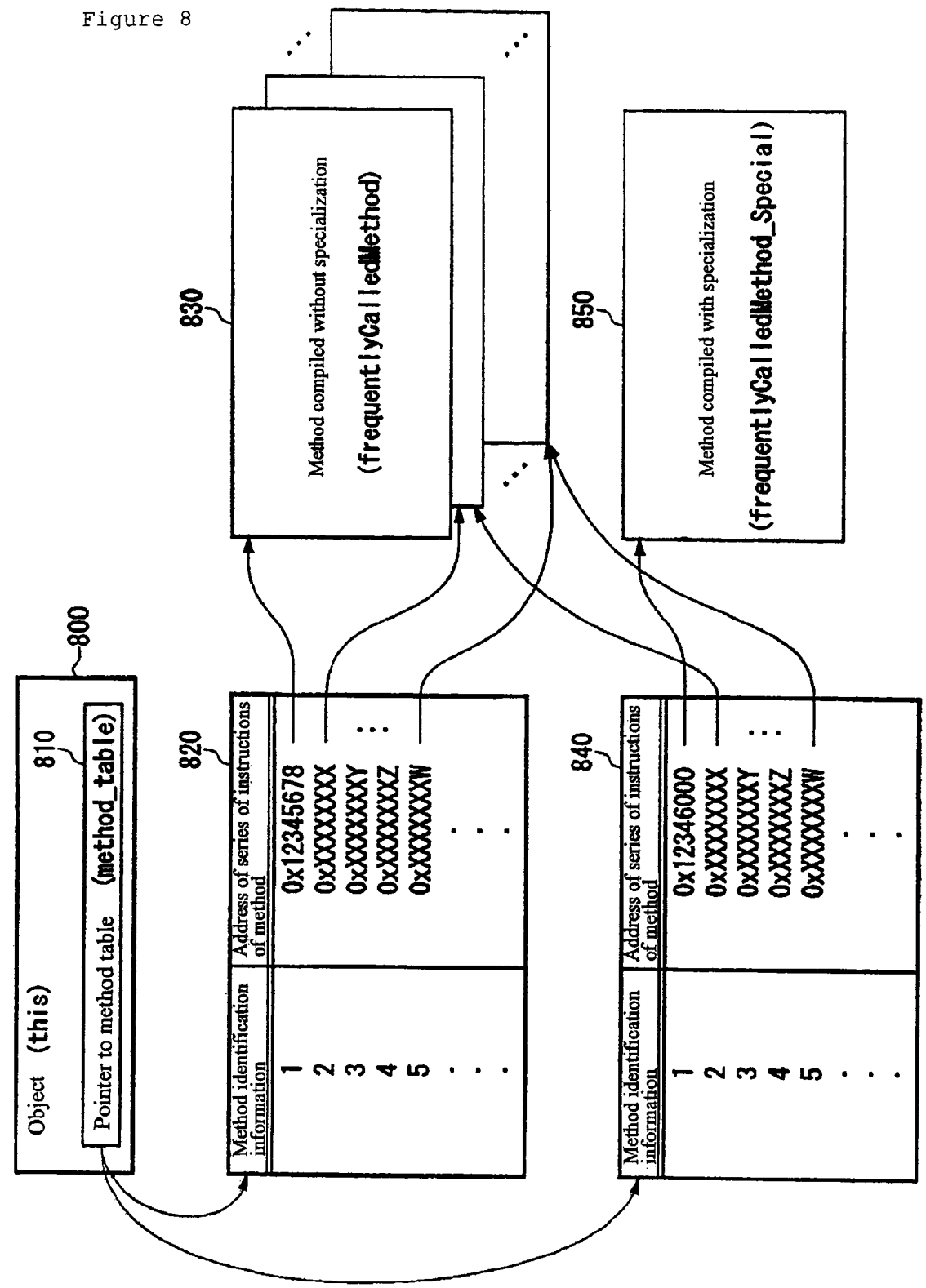
FIG. 8 is a diagram illustrating the structure of a method table.

FIG. 8 illustrates the structure of a method table. If the target program 20 shown in FIG. 6 is executed after being compiled, a runtime system that executes the target program 20 generates an object 800, a first method table 820 and a second method table 840 which are method tables for the object 800, a series of instructions 830 compiled without being specialized for the variable fCalled, and a series of instructions 850 compiled by being specialized for the variable fCalled. If the optimization compiler 10 is a dynamic compiler such as a Just In Time compiler, the series of instructions 830 may execute the method frequentlyCalledMethod after compiling it. Likewise, the series of instructions 850 may execute the method frequentlyCalledMethod after compiling it by specialization.

The first method table 820 and the second method table 840 store identification information on each of a plurality of methods of the object 800 so that the information is associated with the address in a series of instructions obtained by compiling the method. For example, the first method table 820 stores the address in the series of instructions 830 in association with identification information 1 on a method. The second method table 840 stores the address in the series of instructions 850 in association with identification information 1 on a method.

If the variable or the like meets the specification conditions, the set instruction generated by the set instruction generating section 150 rewrites a pointer 810 pointing to the address in the first method table 820 so that it points to the address in the second method table 840. Thus, the subsequently executed call instruction references the second method table 840 as a method table to acquire the address in the series of instructions 850 as the address of the method with the identification information 1. The call instruction then shifts control to this address. Thus, once the set instruction has been executed and it has been determined that the variable or the like meets the specification condition, a specialized method is appropriately called without subsequently executing the set instruction.

Figure 10:
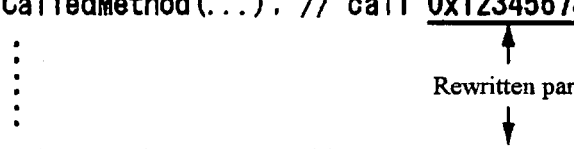
FIG. 10 is a diagram showing the result program 30 in the fourth example in which the optimization compiler 10 compiles the target program 20 by optimizing it for the result program 30.

FIG. 9(a) shows the target program 20 in a fourth example in which the optimization compiler 10 compiles the target program 20 by optimizing it for the result program 30. With reference to FIGS. 9 and 10, description will be given of a process in which the set instruction generating section 150 generates a set instruction to cause the operand of the call instruction to be rewritten. First, as in the case of FIGS. 6 and 7, as update instructions, the update instruction detecting section 100 detects the increment instruction (1) in the sixth line and the substitution instruction (2) in the eighth line. Then, the method detecting section 110 detects the method frequenclyCalledMethod in the ninth to fourteenth lines as a method of executing a different process corresponding to the content of the variable fCalled.

Then, the set instruction generating section 150 detects call instructions (5) and (6) to call the method frequentlyCalledMethod, in the eighteenth and nineteenth lines. These call instructions call a method having a static attribute indicating that the call destination address is not changed when the program is executed. Accordingly, each of these call instructions is compiled into "call", which is an instruction code indicative of a shift of the control, and "0x12345678", which is an operand indicative of the address to which the control is to be shifted. Then, the set instruction generating section 150 manages the addresses of the detected call instructions as a list of instructions for which the call destination addresses are to be rewritten.

FIG. 9(b) shows an example of a list of instructions for which the call destination addresses are to be rewritten, the list being managed by the set instruction generating section 150. The set instruction generating section 150 manages the addresses of call instructions to be rewritten if a method to be called is specialized, in association with identification information on the method, for example, the name of the method. Specifically, the set instruction generating section 150 manages the addresses of the instructions (5) and (6) in association with the name frequentlyCalledMethod of the method.

If a new call instruction is compiled, the set instruction generating section 150 adds the address of this call instruction to the list of the addresses of call instructions to be rewritten. On the other hand, if any call instruction is removed by another optimization or the like, the set instruction generating section 150 deletes the address of this call instruction from the list of the addresses of call instructions to be rewritten.

FIG. 10 shows the result program 30 in a fourth example in which the optimization compiler 10 compiles the target program 30 by optimizing it for the result program 30. The set instruction generating section 150 generates, at a position executed immediately after an increment instruction (1), a set instruction to change the operands of call instructions to 0x12345678, which is the address of an unspecialized method. The process will be described in detail. The set instruction references the list of instructions for which the call destination addresses are to be rewritten, the list being shown in FIG. 9(b). The set instruction thus selects call instructions for which the call destination addresses are to be rewritten. The set instruction then changes the operands of the selected call instructions to the address of the method frequentlyCalledMethod.

On the other hand, the set instruction generating section 150 generates, at a position executed immediately after a substitution instruction (2), a set instruction to change the operands of call instructions to 0x12346000, which is the address of a specialized method. The process will be described in detail. The set instruction references the list of instructions for which the call destination addresses are to be rewritten, the list being shown in FIG. 9(b). The set instruction thus selects call instructions for which the call destination addresses are to be rewritten. The set instruction then changes the operands of the selected call instructions to the address of the method frequentlyCalledMethod_Special.

Thus, the set instruction changes the operands of the instruction codes call, shown in the twenty-second and twenty-third lines, to 0x12345678 or 0x12346000. As a result, the call instructions in the twenty-second and twenty-third lines can appropriately call the frequentlyCalledMethod and/or the frequentlyCalledMethod_Special depending on the content of the variable fCalled.

FIG. 11 shows a fifth example in which the optimization compiler 10 compiles the target program 20 by optimizing it for the result program 30. FIG. 11(a) shows the target program 20 that has not been optimized yet. As an update instruction for the member variable fEncodingType in the object, the update instruction detecting section 100 detects, in the fifth line of the target program 20, a substitution instruction (1) to substitute the content of the argument encodingType of the method init into the variable fEncodingType. The method detecting section 110 also detects the method convertCharsToBytes in the sixth to nineteenth lines of the target program 20, the method convertCharsToBytes executing a different process corresponding to the content of the member variable fEncodingType.

FIG. 11(b) shows the optimized result program 30. In the present figure, if the detected method convertCharsToBytes has been optimized for a process executed if the variable fEncodingType has a particular content, the optimization effect calculating section 120 calculates a reduction in execution time compared to the case in which the method is compiled without being optimized for the process. For example, the optimization effect calculating section 120 acquires profile information indicating that the probability that the substitution instruction (1) substitutes the value EncodingSupport.U16BE is higher than the probability that the substitution instruction (1) substitutes another value and is, for example, 90%.

The optimization effect calculating section 120 calculates an estimated reduction in the time required to execute the method convertCharsToBytes if the method is optimized for a process executed if the variable fEncodingType is EncodingSupport.U16BE compared to the case in which the method is compiled without being optimized for the process. In response to this, if the method compile section 140 determines that the effect of the optimization exceeds the overhead in the optimization, it compiles the method convertCharsToBytes by optimizing the method for a process executed if the variable fEncodingType is EncodingSupport.U16BE. The result of the compilation is shown as the method convertCharsToBytes_Special in the tenth to sixteenth lines in FIG. 11(*b*). The method compile section 140 has successfully removed a switch sentence described in the eighth line in FIG. 11(*a*).

Then, the set instruction generating section 150 generates a set instruction (2) executed if the content of the variable EncodingType is EncodingSupport.U16BE, to store the address of the method optimized by the method compile section 140, in the method table. Moreover, as the set instruction (2), the set instruction generating section 150 stores, in the ninth line, the instruction of storing in the method table the address of the method which is executed if the content of the variable EncodingType is not EncodingSupport.U16BE and which has not been optimized by the method compile section 140.

As described above and shown in the present figure, the optimization compiler 10 calculates the effect of optimization and an overhead in it on the basis of profile information. The optimization compiler 10 can thus appropriately execute optimization only if specialization is ensured to improve the execution speed.

FIG. 12 shows a sixth example in which the optimization compiler 10 compiles the target program 20 by optimizing it. The update instruction detecting section 100 references the attribute of the array variable table to detect that the array variable private is obtained only from the same object. The update instruction detecting section 100 analyzes all the methods in the object. The update instruction detecting section 100 detects an initialization instruction (1) to initialize the array variable table in the constructor for the object as an update instruction for the array variable table. Here, the initialization instruction (1) obtains a storage area for the array variable table and substitutes a pointer to the storage area into the variable. The initialization instruction (1) stores the value of HASHTABLE_SIZE, indicating the size of the array variable table, in the storage area on the memory specified by the array variable table. Thus, the update instruction includes not only an instruction to substitute a numerical value into a variable but also an instruction to store a numerical value in the storage area specified by a variable.

Then, the method detecting section 110 detects the method get in the eighth to twelfth lines of the target program 20 which method executes a different process corresponding to the content of the array variable table. For example, the method get has, in the twelfth line, a reference instruction (2) to reference the array variable table and executes the subsequent processing on the basis of the result of the reference. Further, before referencing the content of the variable, the reference instruction (2) determines whether or not the variable hash, a subscript of the array table, indicates the storage area provided as an array variable. If this condition is not met, the reference instruction (2) notifies the user that an exception is occurring. In the description below, this will be called an array boundary check process.

Subsequently, the method compile section 140 compiles the method get by optimizing it for a process executed if the variable HASHTABLE_SIZE is 128. As a result, with a specialized method, the variable hash, the subscript of the array variable table, is always less than 128. Thus, the method compile section 140 can use the reference instruction (2) to remove the array boundary check process.

As described above and shown in the present figure, the optimization compiler 10 can optimize each method for a process executed not only if a variable has a particular content but also of the content stored in the storage area specified by the variable is the particular one. This makes it possible to increase the number of methods to be optimized to further improve the execution efficiency of the program. Moreover, even if the method compile section 140 executes an inline process that is an optimization that copies a series of instructions processing the method get into a series of instructions for another method and executes the former series of instructions as a part of the latter method, the method compile section 140 preferably copies the specialized method get into the series of instructions for the latter method.

As shown in the present figure, a reference instruction for an array variable contains an array boundary check process and a process of referencing the content of the array variable. These processes are compiled into an instruction to read the size of a storage area provided as an array variable and compares it with a subscript and a load instruction to read the content of the array variable from the memory. Here, even if the method compile section 140 removes the array boundary check process by specialization, provided that another thread changes the content of this array variable, the load instruction to read the content of the array variable from the memory is executed without being removed.

If a method other than a constructor executes an instruction to initialize an array variable or an instruction to increase the size of the array variable, compared to the example in the present figure, it is unknown what method has initialized an array variable corresponding to the address to which the load instruction reads the content of the array variable from the memory. Thus, when the array boundary check instruction is removed, disadvantageously an expectation to be notified of cannot be notified of. Accordingly, the optimization compiler 10 specializes methods on which the load instruction is executed in spite of specialization if only the constructor detects a change instruction as in the case of the present figure.

Figure 13:
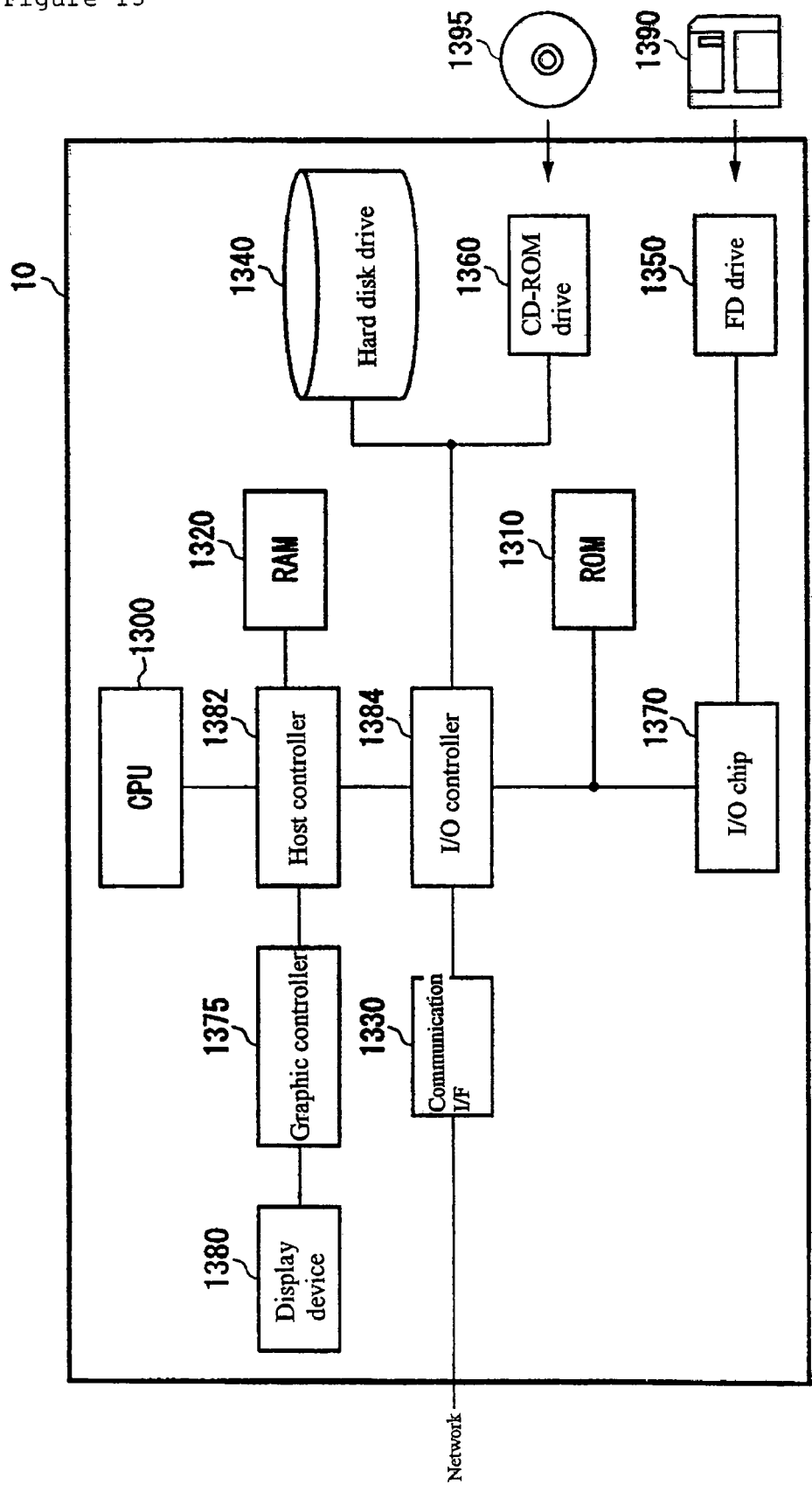
FIG. 13 is a diagram showing the hardware configuration of a computer functioning as the optimization compiler 10.

FIG. 13 shows an example of the hardware configuration of a computer functioning as the optimization compiler 10. The optimization compiler 10 comprises a CPU peripheral section having a CPU 1300, RAM 1320, a graphic controller 1375, and a display device 1380 all connected together by a host controller 1382; an input and output section having a communication interface 1330, a hard disk drive 1340, and a CD-ROM drive 1360 all connected to the host controller 1382 by an input and output controller 1384; and a legacy input and output section having a ROM 1310, a flexible disk drive 1350, and an input and output chip 1370 all connected to the input and output controller 1384.

The host controller 1382 connects the RAM 1320 to the CPU 1300 and a graphic controller 1375 both of which access the RAM 1320 at a high transfer rate. The CPU 1300 operates on the basis of programs stored in the ROM 1310 and the RAM 1320 to execute various types of control. The graphic controller 1375 acquires image data generated by the CPU 1300 or the like on a frame buffer provided in the RAM 1320. The graphic controller 1375 then causes the image data to be displayed on the display device 1380. Alternatively, the graphic controller 1375 may contain a frame buffer that stores image data generated by the CPU 1300 or the like.

The input and output controller 1384 connects the host controller 1382 to the communication interface 1330, hard disk drive 1340, and CD-ROM drive 1360, all of which are relatively fast input and output devices. The communication interface 1330 communicates with an external device via a network. The hard disk drive 1340 stores programs and data used by the optimization compiler 10. The CD-ROM driver 1360 reads a program or data from a CD-ROM 1395 and provides it to the input and output chip 1370.

The input and output controller 1384 connects to relatively slow input and output devices such as the ROM 1310, the flexible disk drive 1350, and the input and output chip 1370. The ROM 1310 stores a boot program executed by the CPU 1300 when the optimization compiler 10 is activated and a program for the optimization compiler 10 which depends on hardware. The flexible disk drive 1350 reads a program or data from the flexible disk 1390. The flexible disk drive 1350 provides the read program or data the input and output chip 1370 via the RAM 1320. The input and output chip 1370 connects to the flexible disk 1390 and to various input and output devices via, for example, a parallel port, a serial port, a keyboard port, or a mouse port.

A user provides the optimization compiler 10 with a program, for example, a conversion program according to the present invention by storing it in a recording medium such as the flexible disk 1390, the CD-ROM 1395, or an IC card. The conversion program is read from the recording medium and installed in the optimization compiler 10 for execution via the input and output chip 1370 and/or input and output controller 1384.

The conversion program installed in the optimization compiler 10 for execution includes an update instruction detecting module, a method detecting module, an optimization effect calculating module, an optimization overhead calculating module, a method compile module, and a set instruction generating module. Operations that the modules cause the optimization compiler 10 to perform are the same as those of the corresponding members of the optimization compiler 10, described in FIGS. 1 to 12. Accordingly, description of these operations is omitted.

The programs or modules described above may be stored in external storage media. The storage media may include the flexible disk 1390, the CD-ROM 1395, an optical recording medium such as a DVD or a PD, a magneto optic recording medium such as an MD, a tape medium, and a semiconductor memory such as an IC card. Alternatively, a storage device such as a hard disk or RAM provided in a server system connected to an exclusive communication network or the Internet may be used as a recording medium. The programs can thus be provided to the optimization compiler 10 via the network.

As described above and shown in the present embodiment, the optimization compiler 10 generates, in a part of the program executed every time an update instruction to update the content of a variable or the like, a set instruction to determine whether or not the content updated by the update instruction meets the conditions for the specialization of the method to switch the call destination for the method. As a result, once the set instruction is executed to determine that the variable or the like meets the specialization conditions, the specialized method is appropriately called without subsequently executing the set instruction. Thus, if the method referencing the variable or the like is executed more frequently than the update instruction for the variable or the like, the frequency at which the set instruction is executed can be reduced to improve the execution efficiency of the program.

The optimization compiler 10 also references the attribute specified for the variable to appropriately select a range of the target program within which the update instruction or method is to be detected. Thus, the optimization compiler 10 can quickly detect all the update instructions to update a certain variable. It can also quickly detect a method that executes a different process corresponding to the content of the variable. Further, the optimization compiler 10 can execute optimization only if specialization is ensured to improve the execution speed, by calculating the effect of and an overhead in the optimization on the basis of the runtime profile information on the target program.

The present invention has been described with reference to the embodiment. However, the technical scope of the present invention is not limited to the range described in the above embodiment. It is apparent to those skilled in the art that various alterations and modifications may be made to the above embodiment. It is clear from the claims that embodiments to which such alterations or modifications are added may be included in the technical scope of the present invention.

The embodiment shown above realizes the compiler, compile method, compile program, and recording medium shown in the items below.

(Item 1) An optimization compiler comprising an update instruction detecting section that detects, in a target program to be optimized, an update instruction to update a content of a variable or a content of a storage area specified by a variable, a series of instructions detecting section that detects a series of instructions in the target program, the series of instructions executes a different process corresponding to the content of the variable or the content of the storage area in response to control shifting to the process by a control shift instruction to shift the control to a different series of instructions, a series of instructions compile section that compiles the detected series of instructions by optimizing the series of instructions for a process executed if the variable or the storage area has a predetermined particular content, and a set instruction generating section that generates a set instruction to set a destination address in the control shift instruction to an address of the series of instructions optimized by the series of instructions compile section, the set instruction being executed between the update instruction and the control shift instruction in the target program if the variable or the storage area has the particular content.

(Item 2) The optimization compiler according to Item 1, wherein the target program is described in an object oriented program language, the series of instructions is a method in an object, the control shift instruction calls each of a plurality of methods in the object by selecting an address associated with identification information on the method to be called, from a method table in which identification information on each method is associated with an address of the series of instructions that has compiled the method, and the set instruction generating section generates, as the set instruction, an instruction executed if the content updated by the update instruction is the particular one, to store the address of the series of instructions optimized by the series of instructions compile section, in the method table.

(Item 3) The optimization compiler according to Item 1, wherein the control shift instruction contains an instruction code that instructs a shift in control and an operand indicating an address to which the control is shifted, and the set instruction generating section generates, as the set instruction, an instruction executed if the content updated by the update instruction is the particular one, to change the operand of the control shift instruction to the address of the series of instructions optimized by the series of instructions compile section.

(Item 4) The optimization compiler according to Item 1, wherein an attribute is specified for each variable in the target program, the attribute indicating a read and write allowable range of the target program within which an instruction to read or write the content of the variable is allowed to be executed, the update instruction detecting section detects an instruction to update each variable in the read and write allowable range for the variable, and the series of instructions detecting section detects, in the read and write allowable range for the variable, a series of instructions that executes a different process corresponding to the content of the variable or the content of a storage area specified by the content of the variable.

(Item 5) The optimization compiler according to Item 4, wherein for each variable in the target program, the update instruction detecting section detects all update instructions for the variable or the storage area specified by the variable, in the read and write allowable range for the variable, and if the update instruction detecting section detects all the update instructions for the variable or the storage area specified by the variable, the series of instructions compile section generates a specialized series of instructions by compiling the series of instructions detected by the series of instructions detecting section by optimizing the series of instructions for a process executed if the variable or the storage area has the particular content, and generates a normal series of instructions by compiling the series of instructions without optimizing the series of instructions for the process, and for each update instruction detected by the update instruction, in a range of the program executed between the update instruction and the control shift instruction, the set instruction generating section sets the destination address to an address of the specialized series of instructions if the content updated by the update instruction is the particular one, and generates, as the set instruction, an instruction to set the destination address to an address of the normal series of instructions if the content updated by the update instruction is not the particular one.

(Item 6) The optimization compiler according to Item 5, wherein the set instruction generating section further generates a set instruction to set the destination address of each control shift instruction to an address of the normal series of instructions, in a reflection method of changing the content of the variable or the content of the storage area specified by the variable, from outside the read and write allowable range for the variable.

(Item 7) The optimization compiler according to Item 1, further comprising an optimization effect calculating section that operates if the series of instructions detected by the series of instructions detecting section has been optimized for the process executed if the content of the variable or the content of the storage area is the particular one, to calculate an estimated reduction in execution time compared to a case in which the series of instructions is compiled without being optimized for the process, the optimization effect calculating section further multiplying the calculated estimated reduction in execution time by an estimated frequency at which the set instruction has been executed, to calculate an effect of the optimization, and an optimization overhead calculating section that calculates an estimated processing time required for the set instruction if the set instruction has been generated and that multiplies the calculated estimated processing time by the execution frequency of the set instruction to calculate an overhead in the optimization, wherein the set instruction generating section generates the set instruction if a sum of effects of the optimization for the respective series of instructions exceeds a sum of overheads in the optimization for the respective set instructions.

(Item 8) The optimization compiler according to Item 7, wherein the optimization effect calculating section calculates an estimated reduction in execution time accomplished by deleting instructions to read the content of the variable or the content of the storage area if a range of the series of instructions detected by the series of instructions detecting section does not contain any instructions that can change the content of the variable or the content of the storage area, the range being executed before an instruction to read the content of the variable or the storage area.

(Item 9) The optimization compiler according to Item 7, wherein a programmer of the target program can specify, for each variable in the target program, a volatile attribute indicating that the content of the variable can be updated by a process executed by another thread, and the optimization effect calculating section calculates an estimated reduction in execution time accomplished by deleting instructions to read the content of the variable or the content of the storage area from the series of instructions detected by the series of instructions detecting section if the volatile attribute is not specified in the variable updated by the update instruction or in a variable specifying the storage area updated by the update instruction.

(Item 10) The optimization compiler according to Item 1, wherein the target program is described in an object oriented program language, the series of instructions is a method in an object, and if an update instruction for a predetermined variable or storage area is detected only in a constructor for an object in the target program, the series of instructions compile section compiles a series of instructions that executes a different process corresponding to the content of the variable or the storage area by optimizing the series of instructions for a process executed if the content of the variable or the storage area is a particular one.

(Item 11) The optimization compiler according to Item 1, wherein the target program is described in an object oriented program language, the update instruction detecting section detects, as the update instruction, an instruction to update a content of a member variable of the object or a content of a storage area specified by the member variable, the series of instructions detecting section detects, as the series of instructions, a method called and executed by a method call instruction to carry out a different process corresponding to the content of the member variable or the content of the storage area specified by the member variable, the series of instructions compile section compiles the method detected by the series of instructions detecting section by optimizing the method for a process executed if the content of the member variable or the content of the storage area specified by the member variable is the particular content, and the set instruction generating section generates, as the set instruction, an instruction executed if the content updated by the update instruction is the particular one, to set a call destination address in the method call instruction to an address of the method optimized by the series of instructions compile section.

(Item 12) A compile method of using a computer to optimize a target program, the method comprising an update instruction detecting step of using the computer to detect, in the target program, an update instruction to update a content of a variable or a content of a storage area specified by the variable, a series of instructions detecting step of using the computer to detect a series of instructions in the target program, the series of instructions executes a different process corresponding to the content of the variable or the content of the storage area in response to that control is shifted to the process by a control shift instruction to shift the control to a different series of instructions, a series of instructions compile step of using the computer to compile the detected series of instructions by optimizing the series of instructions for a process executed if the variable or the storage area has a predetermined particular content, and a set instruction generating step of using the computer to generate a set instruction to set a destination address in the control shift instruction to an address of the series of instructions optimized by the series of instructions compile section, the set instruction being executed between the update instruction and the control shift instruction in the target program if the variable or the storage area has the particular content.

(Item 13) A compile program for allowing a computer to optimize a target program, the program allowing the computer to function as an update instruction detecting section that detects, in a program to be optimized, an update instruction to update a content of a variable or a content of a storage area specified by a variable, a series of instructions detecting section that detects a series of instructions in the target program, the series of instructions executes a different process corresponding to the content of the variable or the content of the storage area in response to control shifting to the process by a control shift instruction to shift the control to a different series of instructions, a series of instructions compile section that compiles the detected series of instructions by optimizing the series of instructions for a process executed if the variable or the storage area has a predetermined particular content, and a set instruction generating section that generates a set instruction to set a destination address in the control shift instruction to an address of the series of instructions optimized by the series of instructions compile section, the set instruction being executed between the update instruction and the control shift instruction in the target program if the variable or the storage area has the particular content.

(Item 14) A recording medium in which the compile program according to Item 13 is recorded.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. An optimization compiler embodied on a physical computer-readable medium comprising:

an update instruction detecting section that detects, in a target program to be optimized, an update instruction to update a content of a variable or a content of a storage area specified by a variable;

a series of instructions detecting section that detects a series of instructions in said target program, the series of instructions executes a different process corresponding to the content of said variable or the content of said storage area in response to control shifting to the process by a control shift instruction to shift the control to a different series of instructions;

a series of instructions compile section that compiles the detected series of instructions by optimizing the series of instructions for a process executed if said variable or said storage area has a predetermined particular content; and a set instruction generating section that generates a set instruction to set a destination address in said control shift instruction to an address of said series of instructions optimized by said series of instructions compile section, the set instruction being executed between said update instruction and said control shift instruction in said target program if said variable or said storage area has said particular content;

wherein:

said control shift instruction contains an instruction code that instructs a shift in control and an operand indicating an address to which the control is shifted;

said set instruction generating section generates, as said set instruction, an instruction executed if the content updated by said update instruction is said particular one, to change the operand of said control shift instruction to the address of the series of instructions optimized by said series of instructions compile section;

an attribute is specified for each variable in said target program, the attribute indicating a read and write allowable range of said target program within which an instruction to read or write the content of the variable is allowed to be executed;

said update instruction detecting section detects an instruction to update each variable in said read and write allowable range for the variable, said series of instructions detecting section detects, in said read and write allowable range for the variable, a series of instructions that executes a different process corresponding to the content of the variable or the content of a storage area specified by the content of the variable;

for each variable in said target program, said update instruction detecting section detects all update instructions for the variable or the storage area specified by the variable, in the read and write allowable range for the variable, if said update instruction detecting section detects all the update instructions for the variable or the storage area specified by the variable, said series of instructions compile section generates a specialized series of instructions by compiling said series of instructions detected by said series of instructions detecting section by optimizing the series of instructions for a process executed if the variable or the storage area has said particular content, and generates a normal series of instructions by compiling the series of instructions without optimizing the series of instructions for the process, for each update instruction detected by said update instruction, in a range of the program executed between the update instruction and said control shift instruction, said set instruction generating section sets said destination address to an address of said specialized series of instructions if the content updated by the update instruction is said particular one, and generates, as said set instruction, an instruction to set said destination address to an address of said normal series of instructions if the content updated by the update instruction is not said particular one;

said set instruction generating section further generates a set instruction to set the destination address of each control shift instruction to an address of said normal series of instructions, in a reflection method of changing the content of the variable or the content of the storage area specified by the variable, from outside said read and write allowable range for the variable.

2. The optimization compiler according to claim 1, wherein said target program is described in an object oriented program language, said series of instructions is a method in an object, said control shift instruction calls each of a plurality of methods in the object by selecting an address associated with identification information on the method to be called, from a method table in which identification information on each method is associated with an address of the series of instructions that has compiled the method, and said set instruction generating section generates, as said set instruction, an instruction executed if the content updated by said update instruction is said particular one, to store the address of the series of instructions optimized by said series of instructions compile section, in said method table;

further comprising:

an optimization effect calculating section that operates if said series of instructions detected by said series of instructions detecting section has been optimized for the process executed if the content of said variable or the content of said storage area is said particular one. to calculate an estimated reduction in execution time compared to a case in which the series of instructions is compiled without being optimized for the process, the optimization effect calculating section further multiplying the calculated estimated reduction in execution time by an estimated frequency at which the set instruction has been executed, to calculate an effect of the optimization; and an optimization overhead calculating section that calculates an estimated processing time required for the set instruction if the set instruction has been generated and that multiplies the calculated estimated processing time by the execution frequency of the set instruction to calculate an overhead in the optimization, wherein:

said set instruction generating section generates the set instruction if a sum of effects of said optimization for the respective series of instructions exceeds a sum of overheads in said optimization for the respective set instructions;

said optimization effect calculating section calculates an estimated reduction in execution time accomplished by deleting instructions to read the content of said variable or the content of said storage area if a range of the series of instructions detected by said series of instructions detecting section does not contain any instructions that can change the content of the variable or the content of the storage area, the range being executed before an instruction to read the content of the variable or the storage area;

a programmer of said target program can specify, for each variable in said target program, a volatile attribute indicating that the content of the variable can be updated by a process executed by another thread, and said optimization effect calculating section calculates an estimated reduction in execution time accomplished by deleting instructions to read the content of said variable or the content of said storage area from the series of instructions detected by said series of instructions detecting section if said volatile attribute is not specified in said variable updated by said update instruction or in a variable specifying said storage area updated by said update instruction, said target program is described in an object oriented program language, said series of instructions is a method in an object, if an update instruction for a predetermined variable or storage area is detected only in a constructor for an object in said target program, said series of instructions compile section compiles a series of instructions that executes a different process corresponding to the content of the variable or the storage area by optimizing the series of instructions for a process executed if the content of the variable or the storage area is a particular one, wherein said target program is described in an object oriented program language, said update instruction detecting section detects, as said update instruction, an instruction to update a content of a member variable of the object or a content of a storage area specified by the member variable, said series of instructions detecting section detects, as said series of instructions, a method called and executed by a method call instruction to carry out a different process corresponding to the content of said member variable or the content of the storage area specified by said member variable, said series of instructions compile section compiles the method detected by said series of instructions detecting section by optimizing the method for a process executed if the content of the member variable or the content of the storage area specified by the member variable is said particular content, and said set instruction generating section generates, as said set instruction, an instruction executed if the content updated by said update instruction is said particular one, to set a call destination address in said method call instruction to an address of the method optimized by said series of instructions compile section.

3. The optimization compiler according to claim 1, wherein said control shift instruction contains an instruction code that instructs a shift in control and an operand indicating an address to which the control is shifted, and said set instruction generating section generates, as said set instruction, an instruction executed if the content updated by said update instruction is said particular one, to change the operand of said control shift instruction to the address of the series of instructions optimized by said series of instructions compile section.

4. The optimization compiler according to claim 1, wherein an attribute is specified for each variable in said target program, the attribute indicating a read and write allowable range of said target program within which an instruction to read or write the content of the variable is allowed to be executed, said update instruction detecting section detects an instruction to update each variable in said read and write allowable range for the variable, and said series of instructions detecting section detects, in said read and write allowable range for the variable, a series of instructions that executes a different process corresponding to the content of the variable or the content of a storage area specified by the content of the variable.

5. The optimization compiler according to claim 4, wherein for each variable in said target program, said update instruction detecting section detects all update instructions for the variable or the storage area specified by the variable, in the read and write allowable range for the variable, if said update instruction detecting section detects all the update instructions for the variable or the storage area specified by the variable, said series of instructions compile section generates a specialized series of instructions by compiling said series of instructions detected by said series of instructions detecting section by optimizing the series of instructions for a process executed if the variable or the storage area has said particular content, and generates a normal series of instructions by compiling the series of instructions without optimizing the series of instructions for the process, and for each update instruction detected by said update instruction, in a range of the program executed between the update instruction and said control shift instruction, said set instruction generating section sets said destination address to an address of said specialized series of instructions if the content updated by the update instruction is said particular one, and generates, as said set instruction, an instruction to set said destination address to an address of said normal series of instructions if the content updated by the update instruction is not said particular one.

6. The optimization compiler according to claim 5, wherein said set instruction generating section further generates a set instruction to set the destination address of each control shift instruction to an address of said normal series of instructions, in a reflection method of changing the content of the variable or the content of the storage area specified by the variable, from outside said read and write allowable range for the variable.

7. The optimization compiler according to claim 1, further comprising an optimization effect calculating section that operates if said series of instructions detected by said series of instructions detecting section has been optimized for the process executed if the content of said variable or the content of said storage area is said particular one, to calculate an estimated reduction in execution time compared to a case in which the series of instructions is compiled without being optimized for the process, the optimization effect calculating section further multiplying the calculated estimated reduction in execution time by an estimated frequency at which the set instruction has been executed, to calculate an effect of the optimization; and an optimization overhead calculating section that calculates an estimated processing time required for the set instruction if the set instruction has been generated and that multiplies the calculated estimated processing time by the execution frequency of the set instruction to calculate an overhead in the optimization, wherein said set instruction generating section generates the set instruction if a sum of effects of said optimization for the respective series of instructions exceeds a sum of overheads in said optimization for the respective set instructions.

8. The optimization compiler according to claim 7, wherein said optimization effect calculating section calculates an estimated reduction in execution time accomplished by deleting instructions to read the content of said variable or the content of said storage area if a range of the series of instructions detected by said series of instructions detecting section does not contain any instructions that can change the content of the variable or the content of the storage area, the range being executed before an instruction to read the content of the variable or the storage area.

9. The optimization compiler according to claim 7, wherein a programmer of said target program can specify, for each variable in said target program, a volatile attribute indicating that the content of the variable can be updated by a process executed by another thread, and said optimization effect calculating section calculates an estimated reduction in execution time accomplished by deleting instructions to read the content of said variable or the content of said storage area from the series of instructions detected by said series of instructions detecting section if said volatile attribute is not specified in said variable updated by said update instruction or in a variable specifying said storage area updated by said update instruction.

10. The optimization compiler according to claim 1, wherein said target program is described in an object oriented program language, said series of instructions is a method in an object, and if an update instruction for a predetermined variable or storage area is detected only in a constructor for an object in said target program, said series of instructions compile section compiles a series of instructions that executes a different process corresponding to the content of the variable or the storage area by optimizing the series of instructions for a process executed if the content of the variable or the storage area is a particular one.

11. The optimization compiler according to claim 1, wherein said target program is described in an object oriented program language, said update instruction detecting section detects, as said update instruction, an instruction to update a content of a member variable of the object or a content of a storage area specified by the member variable, said series of instructions detecting section detects, as said series of instructions, a method called and executed by a method call instruction to carry out a different process corresponding to the content of said member variable or the content of the storage area specified by said member variable, said series of instructions compile section compiles the method detected by said series of instructions detecting section by optimizing the method for a process executed if the content of the member variable or the content of the storage area specified by the member variable is said particular content, and said set instruction generating section generates, as said set instruction, an instruction executed if the content updated by said update instruction is said particular one, to set a call destination address in said method call instruction to an address of the method optimized by said series of instructions compile section.

12. A computer implemented compiler method of using a computer to optimize a target program, the method comprising:

an update instruction detecting section that detects, in a target program to be optimized, an update instruction to update a content of a variable or a content of a storage area specified by a variable;

a series of instructions detecting section that detects a series of instructions in said target program, the series of instructions executes a different process corresponding to the content of said variable or the content of said storage area in response to control shifting to the process by a control shift instruction to shift the control to a different series of instructions;

a series of instructions compile section that compiles the detected series of instructions by optimizing the series of instructions for a process executed if said variable or said storage area has a predetermined particular content; and a set instruction generating section that generates a set instruction to set a destination address in said control shift instruction to an address of said series of instructions optimized by said series of instructions compile section, the set instruction being executed between said update instruction and said control shift instruction in said target program if said variable or said storage area has said particular content;

wherein:

said control shift instruction contains an instruction code that instructs a shift in control and an operand indicating an address to which the control is shifted;

said set instruction generating section generates, as said set instruction, an instruction executed if the content updated by said update instruction is said particular one, to change the operand of said control shift instruction to the address of the series of instructions optimized by said series of instructions compile section;

an attribute is specified for each variable in said target program, the attribute indicating a read and write allowable range of said target program within which an instruction to read or write the content of the variable is allowed to be executed;

said update instruction detecting section detects an instruction to update each variable in said read and write allowable range for the variable, said series of instructions detecting section detects, in said read and write allowable range for the variable, a series of instructions that executes a different process corresponding to the content of the variable or the content of a storage area specified by the content of the variable;

for each variable in said target program, said update instruction detecting section detects all update instructions for the variable or the storage area specified by the variable, in the read and write allowable range for the variable, if said update instruction detecting section detects all the update instructions for the variable or the storage area specified by the variable, said series of instructions compile section generates a specialized series of instructions by compiling said series of instructions detected by said series of instructions detecting section by optimizing the series of instructions for a process executed if the variable or the storage area has said particular content, and generates a normal series of instructions by compiling the series of instructions without optimizing the series of instructions for the process, for each update instruction detected by said update instruction, in a range of the program executed between the update instruction and said control shift instruction, said set instruction generating section sets said destination address to an address of said specialized series of instructions if the content updated by the update instruction is said particular one, and generates, as said set instruction, an instruction to set said destination address to an address of said normal series of instructions if the content updated by the update instruction is not said particular one;

said set instruction generating section further generates a set instruction to set the destination address of each control shift instruction to an address of said normal series of instructions, in a reflection method of changing the content of the variable or the content of the storage area specified by the variable, from outside said read and write allowable range for the variable.

13. A compiler program embodied on a physical computer-readable medium encoded with the compile program for allowing a computer to optimize a target program, the program allowing said computer to function as:

an update instruction detecting section that detects, in a target program to be optimized, an update instruction to update a content of a variable or a content of a storage area specified by a variable;

a series of instructions detecting section that detects a series of instructions in said target program, the series of instructions executes a different process corresponding to the content of said variable or the content of said storage area in response to control shifting to the process by a control shift instruction to shift the control to a different series of instructions;

a series of instructions compile section that compiles the detected series of instructions by optimizing the series of instructions for a process executed if said variable or said storage area has a predetermined particular content; and a set instruction generating section that generates a set instruction to set a destination address in said control shift instruction to an address of said series of instructions optimized by said series of instructions compile section, the set instruction being executed between said update instruction and said control shift instruction in said target program if said variable or said storage area has said particular content;

wherein:

said control shift instruction contains an instruction code that instructs a shift in control and an operand indicating an address to which the control is shifted;

said set instruction generating section generates, as said set instruction, an instruction executed if the content updated by said update instruction is said particular one, to change the operand of said control shift instruction to the address of the series of instructions optimized by said series of instructions compile section;

an attribute is specified for each variable in said target program, the attribute indicating a read and write allowable range of said target program within which an instruction to read or write the content of the variable is allowed to be executed;

said update instruction detecting section detects an instruction to update each variable in said read and write allowable range for the variable, said series of instructions detecting section detects, in said read and write allowable range for the variable, a series of instructions that executes a different process corresponding to the content of the variable or the content of a storage area specified by the content of the variable;

for each variable in said target program, said update instruction detecting section detects all update instructions for the variable or the storage area specified by the variable, in the read and write allowable range for the variable, if said update instruction detecting section detects all the update instructions for the variable or the storage area specified by the variable, said series of instructions compile section generates a specialized series of instructions by compiling said series of instructions detected by said series of instructions detecting section by optimizing the series of instructions for a process executed if the variable or the storage area has said particular content, and generates a normal series of instructions by compiling the series of instructions without optimizing the series of instructions for the process, for each update instruction detected by said update instruction, in a range of the program executed between the update instruction and said control shift instruction, said set instruction generating section sets said destination address to an address of said specialized series of instructions if the content updated by the update instruction is said particular one, and generates, as said set instruction, an instruction to set said destination address to an address of said normal series of instructions if the content updated by the update instruction is not said particular one;

said set instruction generating section further generates a set instruction to set the destination address of each control shift instruction to an address of said normal series of instructions, in a reflection method of changing the content of the variable or the content of the storage area specified by the variable, from outside said read and write allowable range for the variable.

14. A recording medium in which the compile program according to claim 13 is recorded.

15. A computer program product comprising a computer usable medium having computer readable program code means embodied therein for causing functions of an optimization compiler, the computer readable program code means in said computer program product comprising computer readable program code means for causing a computer to effect the functions of claim 1.

16. An article of manufacture comprising a computer usable medium having computer readable program code means embodied therein for causing compilation, the computer readable program code means in said article of manufacture comprising computer readable program code means for causing a computer to effect the steps of claim 12.

17. A program storage device readable by machine, tangibly embodying a program of instructions executable by the machine to perform method steps for compilation, said method steps comprising the steps of claim 12.

18. A computer program product comprising a computer usable medium having computer readable program code means embodied therein for causing compilation, the computer readable program code means in said computer program product comprising computer readable program code means for causing a computer to effect the functions of claim 13.

19. A computer program product comprising a computer usable medium having computer readable program code means embodied therein for causing functions of an optimization compiler, the computer readable program code means in said computer program product comprising computer readable program code means for causing a computer to effect the functions of claim 2.

20. A computer program product comprising a computer usable medium having computer readable program code means embodied therein for causing functions of an optimization compiler, the computer readable program code means in said computer program product comprising computer readable program code means for causing a computer to effect the functions of claim 3.

* * * * *